March 14, 1950
E. DANIEL
PROTECTOR FOR TRAVERSING SCREW ON MICROSCOPE STAGE
2,500,604
Filed Aug. 31, 1946
2 Sheets-Sheet 1
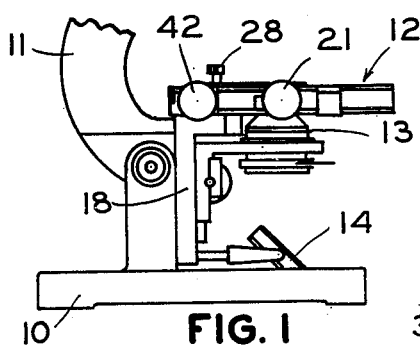
FIG. 1
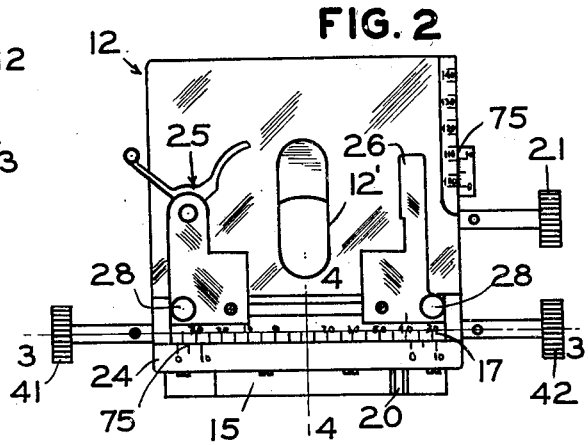
FIG. 2
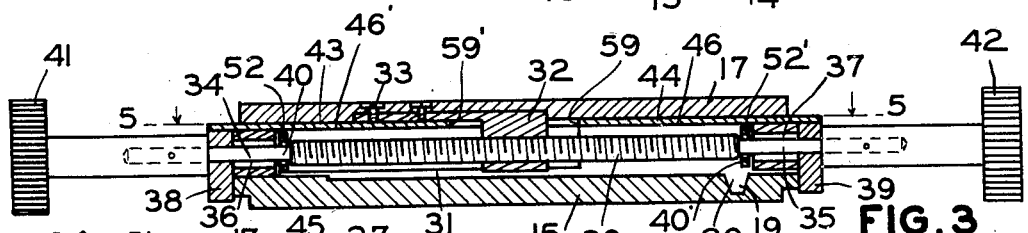
FIG. 3
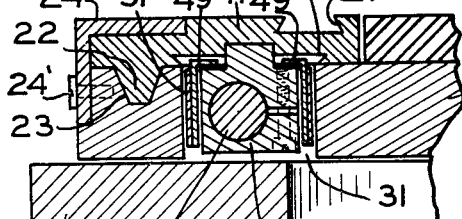
FIG. 4
FIG. 6
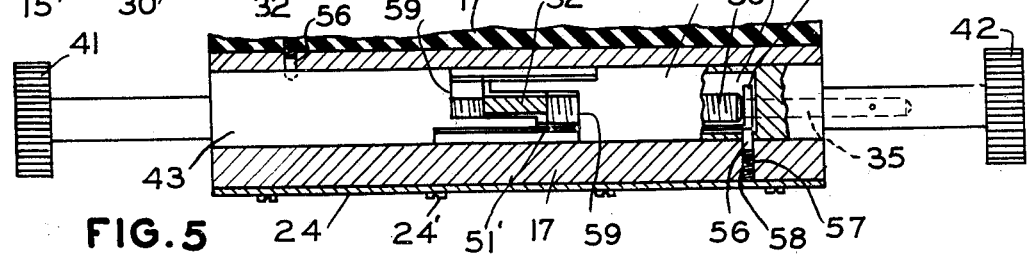
FIG. 5
EBERHARD DANIEL
INVENTOR
BY *[signature]*
ATTORNEY

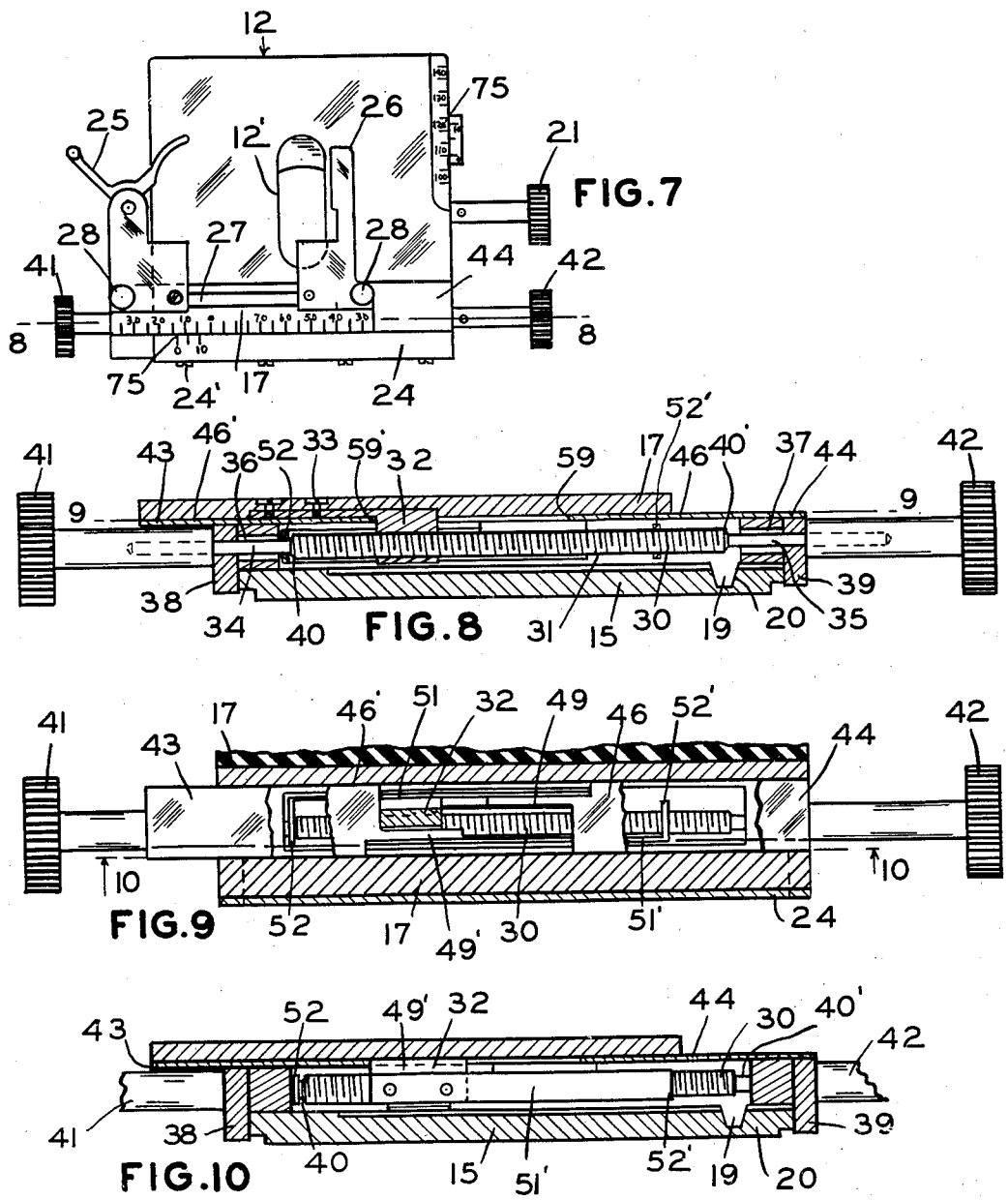

Patented Mar. 14, 1950 2,500,604

UNITED STATES PATENT OFFICE 2,500,604

PROTECTOR FOR TRAVERSING SCREW ON MICROSCOPE STAGE

Eberhard Daniel, Irondequoit, N. Y., assignor to Bausch & Lomb Optical Company, Rochester, N. Y., a corporation of New York Application August 31, 1946, Serial No. 694,377

3 Claims. (Cl. 88—40)

The present invention relates to microscopes and more particularly to the operative mechanism for moving parts of the stage of the microscope.

In microscopes of the type which have a slide traversable in the stage thereof, difficulty has been experienced in keeping the traversing mechanism free from injurious material while in use.

It is an object of the present invention to provide a novel device of the above type which shelters the traversing mechanism thereof by a simple and economical structure which is reliable in use and of small overall dimensions.

It is another object to provide such a device which neatly and effectively covers the traversing mechanism in all of its operative positions.

It is a further object to provide such a device in which the protective members for the traversing mechanism are effectually aligned and housed by the slide in the stage mechanism.

Further objects and advantages will be apparent to those skilled in this art by reference to the following description and accompanying drawings in which:

Fig. 1 is a fragmentary side view at a reduced scale of a microscope having a stage incorporating a preferred form of the present invention, Fig. 2 is a top view on a reduced scale of the microscope stage shown in Fig. 1 with parts in normal central position, Fig. 3 is a sectional full-sized view of the stage traversing mechanism taken on the line 3—3 of Fig. 2, Fig. 4 is a fragmentary sectional view on an enlarged scale of the stage traversing mechanism taken on the line 4—4 of Fig. 2, Fig. 5 is a sectional view, with parts broken away, taken on the line 5—5 of Fig. 3, Fig. 6 is a perspective view of one of the guard members for the traversing mechanism, Fig. 7 is a view similar to Fig. 2 showing the slide traversed to the left, Fig. 8 is a view similar to Fig. 3 taken on the line 8—8 of Fig. 7 showing the slide traversed to the left, Fig. 9 is a view similar to Fig. 5 taken on the line 9—9 of Fig. 8 showing the slide traversed to the left, and Fig. 10 is a sectional view taken on the line 10—10 of Fig. 9 showing the traversing mechanism for the guard member.

In the drawings, a preferred embodiment of the invention is illustrated in which a base 10, Fig. 1, of a microscope of any desired form supports an arm 11 and a stage 12 having an aperture 12' over which a specimen is placed for examination. Substage means for illuminating the specimen are provided in a well-known manner by using a light condenser 13 together with a mirror 14 for reflecting and intensifying light rays incident on the mirror beneath the specimen.

Traverse motion is provided for the specimen in two directions normal to each other by making the stage 12 in three parts, namely, a bottom plate 15, a longitudinal slide 16, and a cross slide 17. The longitudinal slide 16 is slidably supported on the bottom plate 15 which is attached to a bracket 18 on the base 10 and its travel across the plate 15 is directed by a tongue 19 on the slide 16 fitting within a groove 20 on the plate 15. Suitable mechanism such as a rack and pinion, not shown, are used to traverse the slide 16 on the plate 15, such mechanism being actuated by a knob 21.

For crosswise movement of the specimen, a cross slide 17 is slidably mounted upon the longitudinal slide 16 and is directed in its travel by a tongue 22 on the slide 17 fitting within a groove 23 on the longitudinal slide 16. An angular cap strip 24, attached to the slide 16 by suitable means such as screws 24', assists in retaining the slide 17 in correct assembled position. Holding devices for the specimen of any suitable form such as the slide holders 25 and 26 are adjustably attached to the cross slide 17 in any desired manner such as the dovetailed slot 27 in engagement with a tenon, not shown, which is locked in place by the clamp screws 28.

Traversing means for the cross slide 17 are provided comprising a screw member 30 housed in an elongated opening 31 in the slide 16 underlying the cross slide 17 and a nut member 32 attached to the cross slide 17 by any suitable means such as screws 33. The screw member 30 has extensions 34 and 35 of reduced diameter which pass through clearance holes 36 and 37 in the closed ends of the opening 31 and project outwardly therefrom through journal blocks 38 and 39 attached to the slide 16. The journal blocks 38 and 39 are spaced endwise from the threaded ends on the screw member 30 as shown at 40 and 40', Fig. 8. Knobs 41 and 42 are fixed to the outer ends of extensions 34 and 35 for turning the screw 30.

According to the present invention, means for protecting the screw member 30 from foreign matter which would impair its operation are provided, comprising twin guard members 43 and 44 extending over the opening 31. In Fig. 3 the guard members 43 and 44 are shown in normal position with the slide 17 centered on the slide 16. A dovetailed slot 45 recessed into the undersurface of the cross slide 17 serves to retain, house, and guide the guard members 43 and 44 in close contact with slide 17 while these members are moved along the axis of the screw member 30. As best shown in Fig. 6, the guard member 44 consists of a plate 46 formed with inclined edges 47 and 48 to fit the dovetailed slot 45. A tab 49 thereon is turned vertically downward at 50 and an extension 51 having an up-turned portion 52 thereon is either constructed integrally with the tab portion 50 or attached thereto in any suitable manner such as riveting. The portion 52 is threaded at 53 to form nuts which fit the screw member 30. The other guard member 43 is similarly constructed and its corresponding parts are indicated by primed characters on the drawing.

Means for moving the guard member 44 to a displaced position while allowing the other of the guard member 43 to remain in normal position are provided wherein the threaded portion 52 of the guard member 44 is normally positioned at the end 40 of screw 30 and is disengaged therefrom. The threaded portion 52 of the guard member 44 is forced into locked position at 40 and is held therein by detent 56 of any preferred form which is seated in recess 57 under pressure of spring 58. If desired, the extensions 51 and 51' of the guard members may be formed of spring material so as to eliminate the detents 56. A shoulder 59 is provided on the plate 46 of the guard member 44 in the path of the nut 32 so that as the latter is moved, the threaded portion 52 is moved into initial threaded engagement with the screw member 30 and continued rotation of the screw 30 causes the guard member 44 to move outwardly. The threaded portion 52 moves the guard member 44 back to normal position when the slide 17 is returned to normal position by the rotation of the screw 30 in the opposite direction.

In the operation of the device and starting with the parts in the positions shown in Figs. 2, 3, and 5, rotation of the screw member 30 in a clockwise direction viewed from the right side, causes traversal of the slide 17 to the right. At this moment both guard members 43 and 44 are prevented from moving by the engagement of the threaded portions 52 behind the shoulders formed at the ends 40 and 40' of the screw 30. As traversal of the slide 17 to the right continues, the nut 32 engages the shoulder 59 on guard member 44. This contact with the guard member causes the threaded portion 52 to be moved so that it threadedly engages the screw 30. As the movement of the slide 17 continues, the nut 32 pushes the guard member 44 outwardly to the right. It will be understood that guard member 43 has remained stationary during the movement of slide 17 so that even though the slide 17 has moved to the extreme right of its excursion, the guard member 43 has provided a protective cover for the screw 30 which, under prior art practices would be exposed. As the slide 17 is returned to its normal position by opposite turning movement of screw 30, the guard member 44 will also be returned to its normal position by means of the threaded portion 52 moving on screw 30. If the slide 17 is moved to the left, as in Fig. 8, the guard member 44 remains at rest and the guard member 43 will be moved by the nut 32 engaging the shoulder 59' of plate 46' so as to move the threaded portion 52' into operative engagement with the screw 30.

Suitable cooperating scale means 75 are provided on the relatively movable stage parts as will be understood by those skilled in the art. From the foregoing it will be apparent that I am able to attain the objects of my invention and provide efficient means for protecting the rotatable screw and other parts used for effecting relative movements of the parts of a microscope stage.

Although but one embodiment of the invention has been shown and described in detail, other embodiments are possible and changes may be made in the form and arrangement of the parts and substitutions may be made therein without departing from the spirit of the invention as defined in the appended claims.

I claim:

1. In a microscope, a stage on which a specimen may be mounted, a slide mounted on said stage and adapted to hold a specimen for movement along said stage, a screw rotatably mounted on the stage for moving said slide, a nut threaded onto said screw and fixed to said slide, guard members slidably mounted on said slide on opposite sides of said nut and above said screw, a shoulder on said guard members in the path of travel of said nut by which said guard members are moved in respectively outward directions from said stage as the nut moves with the slide, and threaded extensions on said guard members for engagement with said screw to move the guard members back to normal position upon return of the slide to its normal position.

2. In a microscope having a stage, a slide for holding a specimen, said slide movably mounted on the stage, a screw rotatably mounted on the stage, a threaded nut secured to the slide and in threaded engagement with the screw whereby rotation of the latter will move the slide, a pair of guard plates positioned, respectively, on opposite sides of the nut and above the screw, said plates having threaded means and being slidably mounted to move longitudinally of the screw and having portions in the path of travel of said nut whereby the plates will be moved respectively outwardly as the nut travels outwardly with the slide, said screw operatively engaging the threaded means on the respective plates for moving them back to their normal positions as the nut travels back to its normal central position.

3. In a microscope having a stage, a slide for holding a specimen, said slide movably mounted on the stage, means for moving the slide comprising a screw rotatably mounted on the stage beneath the slide, a nut on the slide in cooperative engagement with the screw, said slide being mounted to move longitudinally of the screw so that the slide will not always overlie parts of the screw, and guard means for protecting the screw in all positions of the slide, said guard means comprising a pair of plates positioned, respectively, on opposite sides of said nut and slidably mounted on the under side of the slide above the screw, said plates having portions located in the path of travel of said nut whereby the plates are moved outwardly as the nut travels outwardly in its respective directions, and threaded means associated with the plates and operatively engaging the screw for returning the plates to their respective inner positions when the nut travels inwardly.

EBERHARD DANIEL.

REFERENCES CITED

The following references are of record in the file of this patent:

UNITED STATES PATENTS

| Number | Name | Date |
|---|---|---|
| 895,093 | Knight | Aug. 4, 1908 |
| 1,080,968 | Hayes | Dec. 9, 1913 |
| 1,981,713 | Swenson | Nov. 20, 1934 |
| 2,119,354 | Riepert | May 31, 1938 |
| 2,265,182 | Mestre | Dec. 9, 1941 |
| 2,375,408 | Gallimore et al. | May 8, 1945 |
| 2,409,288 | Leland | Oct. 15, 1946 |